US009469350B2

(12) United States Patent
Wu

(10) Patent No.: US 9,469,350 B2
(45) Date of Patent: Oct. 18, 2016

(54) UNDERBODY MANUFACTURING METHOD AND VEHICLE UNDERBODY

(71) Applicant: Thunder Power Hong Kong Ltd., Central (HK)

(72) Inventor: Tai-Te Wu, Taoyuan (TW)

(73) Assignee: THUNDER POWER HONG KONG LTD., Central (HK)

( * ) Notice: Subject to any disclaimer, the term of this patent is extended or adjusted under 35 U.S.C. 154(b) by 0 days.

(21) Appl. No.: 14/981,772

(22) Filed: Dec. 28, 2015

(65) Prior Publication Data

US 2016/0272254 A1    Sep. 22, 2016

Related U.S. Application Data

(63) Continuation of application No. 14/748,210, filed on Jun. 23, 2015.

(60) Provisional application No. 62/150,848, filed on Apr. 22, 2015, provisional application No. 62/133,991, filed on Mar. 16, 2015.

(51) Int. Cl.
| | |
|---|---|
| *B62D 27/00* | (2006.01) |
| *B62D 25/20* | (2006.01) |
| *B62D 27/02* | (2006.01) |
| *B21D 5/00* | (2006.01) |
| *B23K 31/02* | (2006.01) |

(52) U.S. Cl.
CPC ............... *B62D 25/20* (2013.01); *B21D 5/00* (2013.01); *B23K 31/02* (2013.01); *B62D 27/023* (2013.01)

(58) Field of Classification Search
CPC ...... B62D 25/20; B62D 27/023; B61D 5/00; B23K 31/02
USPC .................. 296/187.08, 193.07, 204, 203.01
See application file for complete search history.

(56) References Cited

U.S. PATENT DOCUMENTS

| | | | |
|---|---|---|---|
| 4,848,835 A | | 7/1989 | DeRees |
| 5,619,784 A | * | 4/1997 | Nishimoto ............. B62D 65/04 29/430 |
| 6,126,219 A | * | 10/2000 | Wilkinson ............. B62D 33/08 296/204 |
| 6,899,377 B2 | | 5/2005 | Ghuman et al. |
| 7,325,866 B2 | | 2/2008 | Horton et al. |
| 8,641,133 B1 | | 2/2014 | Scaringe et al. |
| 8,985,680 B2 | | 3/2015 | Mildner |

* cited by examiner

*Primary Examiner* — Joseph D Pape
(74) *Attorney, Agent, or Firm* — Kilpatrick Townsend & Stockton LLP

(57) ABSTRACT

The present disclosure provides an underbody manufacturing method and a vehicle underbody. The method includes determining dimensions for the vehicle underbody and underbody panels, selecting the underbody panels, putting the underbody panels in a stamping die for stamping to form concave and convex parts on the underbody panels, welding the stamped underbody panels to splice the underbody in the length direction and/or the width direction, so as to make the underbody reach the determined length and width. Underbodies with various dimensions can be formed using the same stamping die, and accordingly, die cost is saved and vehicle development time is shortened, which provides convenience for diversified body designs on the whole.

18 Claims, 6 Drawing Sheets

UNDERBODY MANUFACTURING METHOD AND VEHICLE UNDERBODY

CROSS-REFERENCE TO RELATED APPLICATIONS

The present application is a continuation of Non-Provisional U.S. application Ser. No. 14/748,210, filed Jun. 23, 2015, which claims priority to U.S. Provisional Patent Application No. 62/133,991, filed Mar. 16, 2015, and U.S. Provisional Patent Application No. 62/150,848, filed Apr. 22, 2015, the disclosures of which are hereby incorporated by reference in their entireties for all purposes.

BACKGROUND

The present disclosure relates to the field of vehicles, and particularly relates to underbody manufacturing technology of vehicles.

For vehicle design and manufacture, the body design is generally constrained by the underbody design, and therefore, the dimensions of the underbody becomes an important factor when designing the rest of the vehicle. With the increasingly diversified and individualized demands of consumers on vehicles, body designs have also become increasingly diversified and individualized. The difficulty is that different body designs generally need to correspond to underbodies with different dimensions. To manufacture underbodies with different dimensions, different dies corresponding to the different dimensions need to be prepared, as underbodies need to be integrally formed using dies corresponding to the their dimensions. However, the cost of creating a new die is very high, which leads to a longer development time, which then further increases the overall cost of manufacturing the vehicle. Thus, the production of diversified body designs is restricted.

SUMMARY

In view of the above problems, embodiments of the present disclosure are intended to provide an underbody manufacturing method which allows vehicle manufacturers to adjust the dimensions of an underbody without creating additional dies. Embodiments of the present disclosure reduce the manufacturing cost so as to facilitate diversified body and underbody designs of a vehicle.

According to a first aspect of the present disclosure, a method for manufacturing a vehicle underbody is provided. The method includes several steps, including: determining dimensions for the vehicle underbody and underbody panels, selecting the underbody panels, putting the underbody panels in a stamping die for stamping to form concave and convex parts on the underbody panels, welding the stamped underbody panels to splice the underbody in the length direction and/or the width direction, so as to make the underbody reach the determined length and width.

According to a second aspect of the present disclosure, a vehicle underbody is provided. The vehicle underbody includes several underbody panels with dimensions that are based on the dimensions of the vehicle underbody. The vehicle underbody also includes concave parts and convex parts on the underbody panels. The concave parts and convex parts are formed using a stamping die. The vehicle underbody further includes a welded joint between the underbody panels. The vehicle underbody is spliced by the underbody panels that are welded together in the length direction and/or the width direction, so as to make the underbody reach the determined length and width.

The vehicle underbody of the present disclosure has several advantages with respect to the prior art. One of these advantages is that the vehicle underbody provided by the present disclosure is spliced by at least two underbody panels in the length direction and/or the width direction. This allows underbodies with various dimensions to be formed on the condition of using the same stamping die. This results in die cost savings and a shorter vehicle development time, which provides convenience for diversified body designs on the whole.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The present disclosure provides a method for manufacturing underbodies of vehicles. Through the disclosed method, underbodies of vehicles with different body dimensions can be provided using the same stamping die. Examples and further embodiments of the present disclosure will be described below with reference to the accompanying drawings. Although the present disclosure is described by a series of different examples, these different examples may overlap and there may exist many embodiments of the present disclosure that encompass features of more than one of the different examples.

Figure 1:
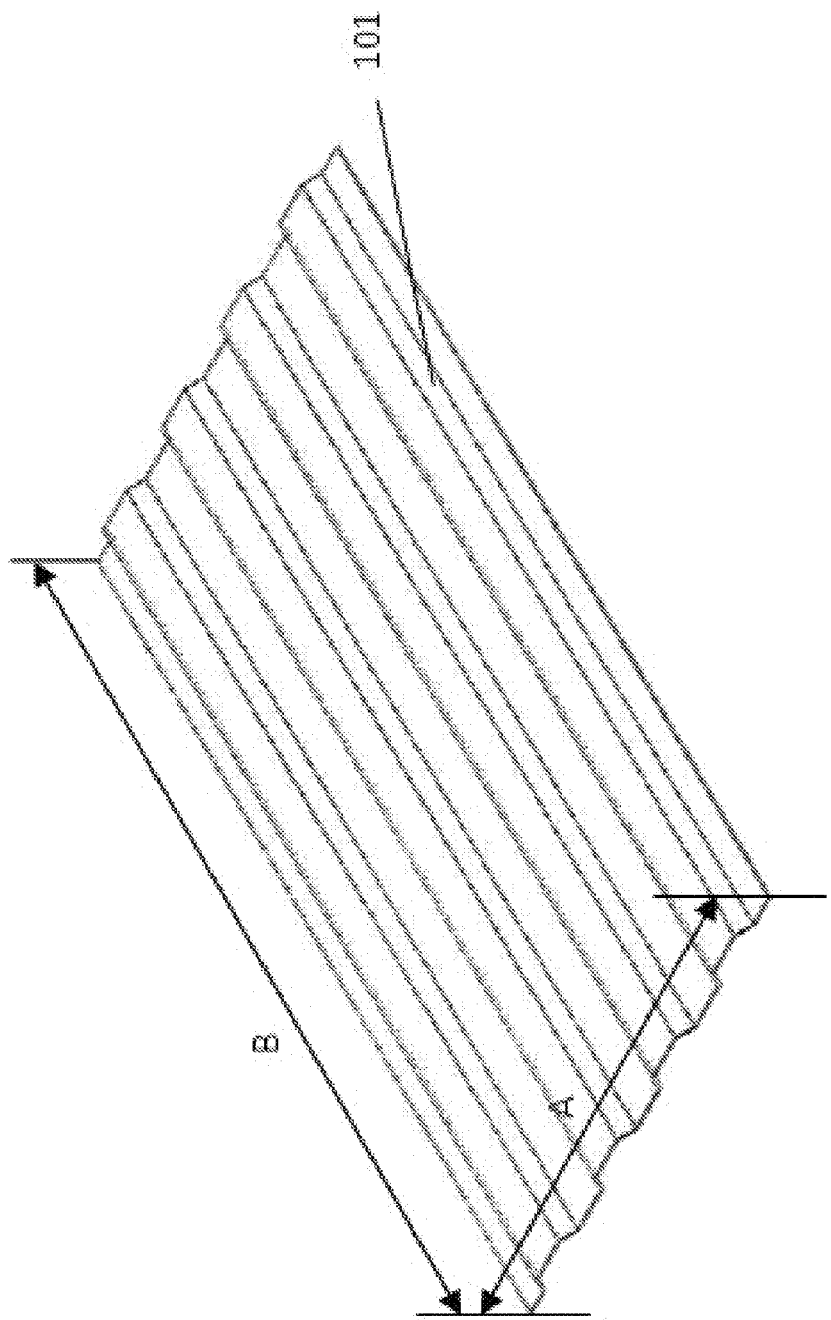
FIG. 1 shows a perspective schematic diagram of a largest underbody panel capable of being stamped by a given stamping die, according to an exemplary embodiment of the present disclosure.

FIG. 1 shows a perspective schematic diagram of an underbody panel 101, according to an exemplary embodiment of the present disclosure. In some embodiments, underbody panel 101 may be the largest underbody panel capable of being stamped by a given stamping die. For the convenience of this disclosure, the dimensions of the largest underbody panel capable of being stamped by a given stamping die are set as a length B and a width A.

Figure 2:
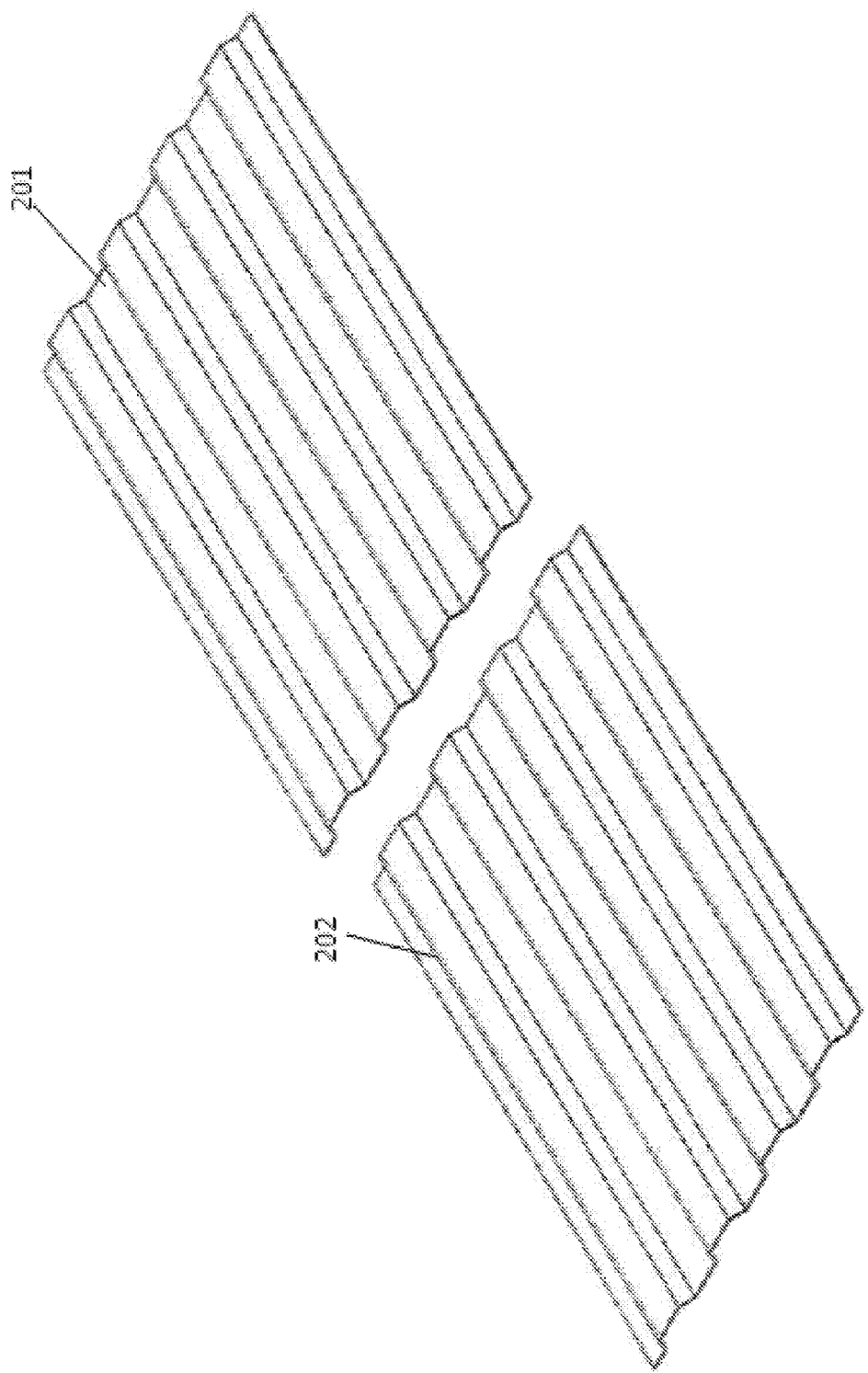
FIG. 2 shows a perspective schematic diagram of two underbody panels in the first example of the present disclosure.

FIG. 2 shows a perspective schematic diagram of two underbody panels in a first example of the present disclosure. In the first example of the present disclosure, an underbody is spliced by two underbody panels 201 and 202 in the length direction. While FIG. 2 shows a perspective schematic diagram of two underbody panels in the first example of the present disclosure, FIG. 3 continues with the first example and shows a perspective schematic diagram of an underbody 301. In some embodiments, the underbody 301 is spliced by two underbody panels 201 and 202 in the length direction. In some embodiments, both of the two underbody panels 201 and 202 may have concave and convex parts, and each of the concave and convex parts may be stamped by the same stamping die.

Figure 3:
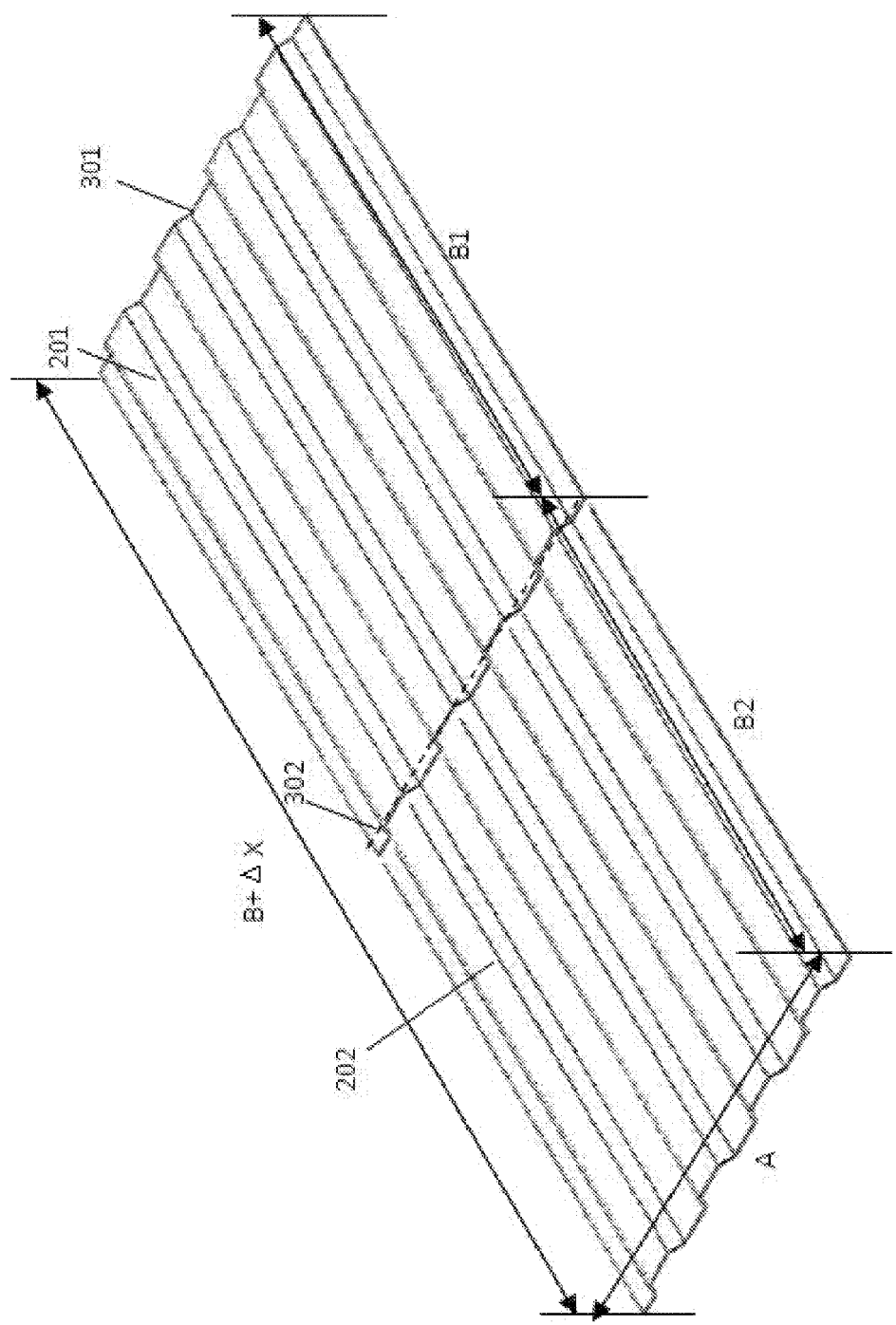
FIG. 3 shows a perspective schematic diagram of an underbody in the first example of the present disclosure.

As shown in FIG. 3, the widths of the underbody panel 201, the underbody panel 202 and the underbody 301 are all equal to the width A of the largest underbody panel 101 capable of being stamped by the stamping die. In addition, the length B1 of the underbody panel 201 and the length B2 of the underbody panel 202 are smaller than the length B of the largest underbody panel 101 capable of being stamped by the stamping die. Furthermore, the length B+ΔX of the underbody 301 is larger than the length B of the largest underbody panel 101 capable of being stamped by the stamping die.

As shown, the length of the underbody that may be formed is larger than that of the largest underbody panel capable of being stamped by a stamping die. This allows a manufacture to splice a plurality of smaller underbody panels (the dimension of each being less than or equal to that of the largest underbody panel capable of being stamped by the stamping die) to conveniently create vehicle underbodies of various sizes using the same die. Therefore, the possible underbodies that may be designed may be adjusted flexibly and are not limited by the dimension of the stamping die.

The manufacturing process of the underbody 301 will now be introduced in further detail. Specifically, when producing the underbody 301, two underbody panels 201 and 202 with predetermined dimensions are selected. In some embodiments, this selection may correspond to cutting a plate material having a larger dimension into two smaller pieces. The plate material may be cut along the length direction or the width direction to select the two underbody panels 201 and 202 with the predetermined dimensions.

It should be noted that the lengths of the two underbody panels 201 and 202 are not necessarily the same. The lengths that are selected by a manufacture may depend on several factors. On the condition that the length of the underbody 301 is known and definite, the selection of the lengths of the underbody panels 201 and 202 may, in some embodiments, depend on the length of the under body 301. In some embodiments, the lengths of the underbody panels 201 may depend on a demand condition. The demand condition of the underbody may be calculated according to seat arrangement to determine a preferred underbody panel splicing solution.

After the two underbody panels 201 and 202 are selected, they are put in the stamping die for stamping to form concave and convex parts on the two underbody panels 201 and 202. The concave and convex parts are arranged to enable the underbody to have larger bearing capacity so as not to break easily in a load bearing process. It should be noted that the dimensions of the selected two underbody panels 201 and 202 are smaller than that of the largest underbody panel 101 capable of being stamped by the stamping die shown in FIG. 1. In some embodiments, the length B1 of the underbody panel 201 and the length B2 of the underbody panel 202 are smaller than the length B of the largest underbody panel 101 capable of being stamped by the stamping die. However, since the two underbody panels 201 and 202 have the same concave and convex parts in the width direction, after the two underbody panels 201 and 202 are spliced along the width direction, a continuous underbody with uniform and consistent concave and convex parts on the whole can be formed.

In some embodiments, because the dimensions of the underbody panels are different, a positioning and fixing device may need to be arranged in the stamping die to position and fix the underbody panels with different dimensions, so as to guarantee the stamping accuracy. For example, the positioning and fixing device can adopt lead screw assemblies in horizontal and longitudinal directions, one end part of each of the two lead screw assemblies can be rotated and moved, and the other end part of each of the two lead screw assemblies respectively abuts against the length position and the width position of each underbody panel.

After stamping, the end parts extending along the width direction of the stamped underbody panels 201 and 202 are welded so that the underbody is spliced by the two underbody panels 201 and 202 to a predetermined length of B+ΔX in the length direction. Specifically, the end parts extending along the width direction of the two underbody panels 201 and 202 may be aligned with each other so that they abut against each other. Then the two underbody panels 201 and 202 may be welded together by a welding operation so that the length of the spliced underbody is B+ΔX.

By means of the above steps, for manufacturing underbodies with different lengths, only the lengths of the underbody panels need to be correspondingly adjusted, therefore the adjustment is flexible and the cost is lower. It should be noted that, the first example merely shows the underbody spliced by two underbody panels along the length direction. In some embodiments, the underbody can be spliced by three or even more underbody panels along the length direction thereof, and this should fall within the protected scope of the present disclosure.

Figure 4A:
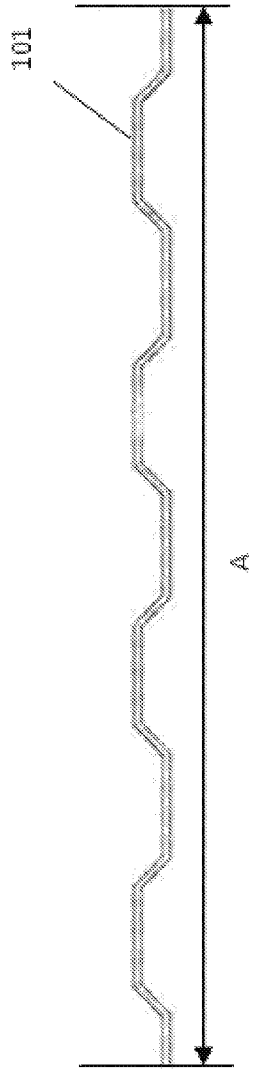
FIG. 4A shows a side schematic diagram of a largest underbody panel capable of being stamped by a given stamping die, according to an exemplary embodiment of the present disclosure.
Figure 4B:
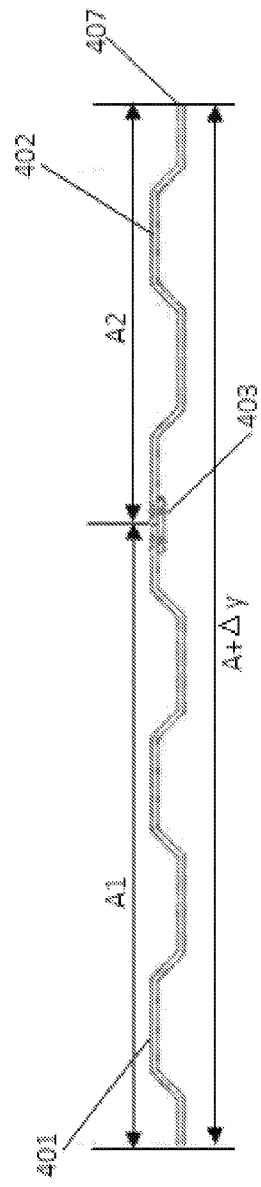
FIG. 4B shows a side schematic diagram of an underbody in the second example of the present disclosure.

FIG. 4A shows a side schematic view from the width direction of the largest underbody panel 101 capable of being stamped by the stamping die, and the width thereof is A. FIG. 4B shows a side schematic diagram of an underbody 407 in a second example of the present disclosure. In contrast to the first example, the underbody 407 in the second example is spliced by two underbody panels 401 and 402 in the width direction. The width of the underbody 407 is A+Δy, and the underbody is spliced by the underbody panel 401 with a width of A1 and the underbody panel 402 with a width of A2. The width A+Δy of the underbody 407 is larger than the width A of the largest underbody panel 101 capable of being stamped by the stamping die, while the widths A1 and A2 of the underbody panels 401 and 402 are smaller than the width A of the largest underbody panel 101 capable of being stamped by the stamping die. Similar to the first example, due to this arrangement in the second example, the underbody panels can be stamped in the same stamping die, and thus do not need to newly manufacture different dies for adapting underbodies with different dimensions.

The specific processing steps in the second example are similar to those in the first example. One of the main differences is that in the cutting step, the plate material is cut along the width direction of the plate material, so as to select the two underbody panels 401 and 402 with the predetermined dimensions. Moreover, it can be seen directly from FIG. 4B that the width A1 of the underbody panel 401 is larger than the width A2 of the underbody panel 402, and this dimension ratio is obtained by calculating the demand condition on the underbody 407 as well. In addition, in contrast to the first example, in the second example the stamped two underbody panels 401 and 402 are welded along the length direction to splice the underbody 407.

It is further shown in FIG. 4B that convex parts of the underbody panel 401 are welded with convex parts of the underbody panel 402, and a welding surface 403 is located on the lower sides of the combined convex parts. Specifically, the underbody panels 401 and 402 respectively have incomplete convex parts in the sides extending along the length direction. The incomplete convex parts of the underbody panels 401 and 402 are mutually matched, therefore in a splicing process, the incomplete convex parts of the underbody panels 401 and 402 are aligned with each other and abut against each other to form a complete convex part. Then, the splicing sites of the incomplete convex parts are welded to form the welding surface 403, so as to finish splicing the two underbody panels in the width direction of the underbody. The underbody spliced in this manner has uniform and consistent concave and convex parts on the whole.

Compared with the welding of concave and convex transition inclined surfaces, the welding of convex parts and convex parts can guarantee the welding firmness on one hand and can guarantee the smoothness of the underbody 407 on the other hand. The welding surface 403 is located on the lower sides of the convex parts, so that the welding surface 403 can be guaranteed to not collide with an object placed above or below the underbody 407, and thus no interference is generated.

It should be noted that the second example of the present disclosure merely shows the underbody spliced by two underbody panels along the width direction. In some embodiments, the underbody can be spliced by three or even more underbody panels along the width direction thereof, and this should fall within the protected scope of the present disclosure.

Figure 4C:
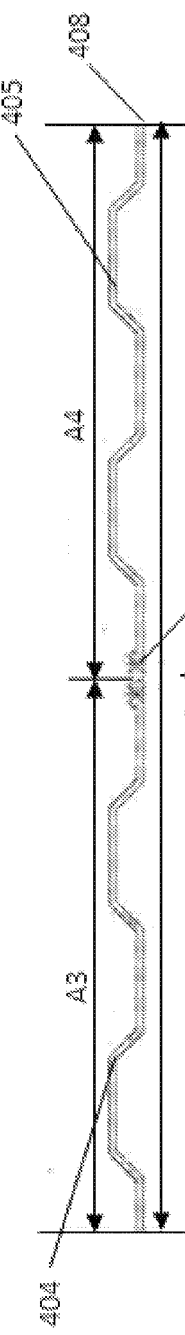
FIG. 4C shows a side schematic diagram of an underbody in the third example of the present disclosure.

FIG. 4C shows a third example of the present disclosure, similar to the second example, in which an underbody 408 is spliced by two underbody panels 404 and 405 in the width direction as well. The dimension relation also satisfies that the width A-Δz of the underbody 408 is larger than the width A of the largest underbody panel 101 capable of being stamped by the stamping die, and the widths A3 and A4 of the underbody panels 404 and 405 are smaller than the width A of the largest underbody panel 101 capable of being stamped by the stamping die.

In some embodiments of the third example, the widths A3 and A4 of the underbody panels 404 and 405 are the same. Moreover, during the welding step, concave parts of the underbody panel 404 are welded with concave parts of the underbody panel 405, and a welding surface 406 is located on the top side of the combined concave parts. The welding of concave parts and concave parts has the same effect as the welding of convex parts and convex parts in the second example, and the welding surface 406 is arranged on the upper sides of the combined concave parts for preventing collision with the object placed above or below the underbody 408.

Figure 5:
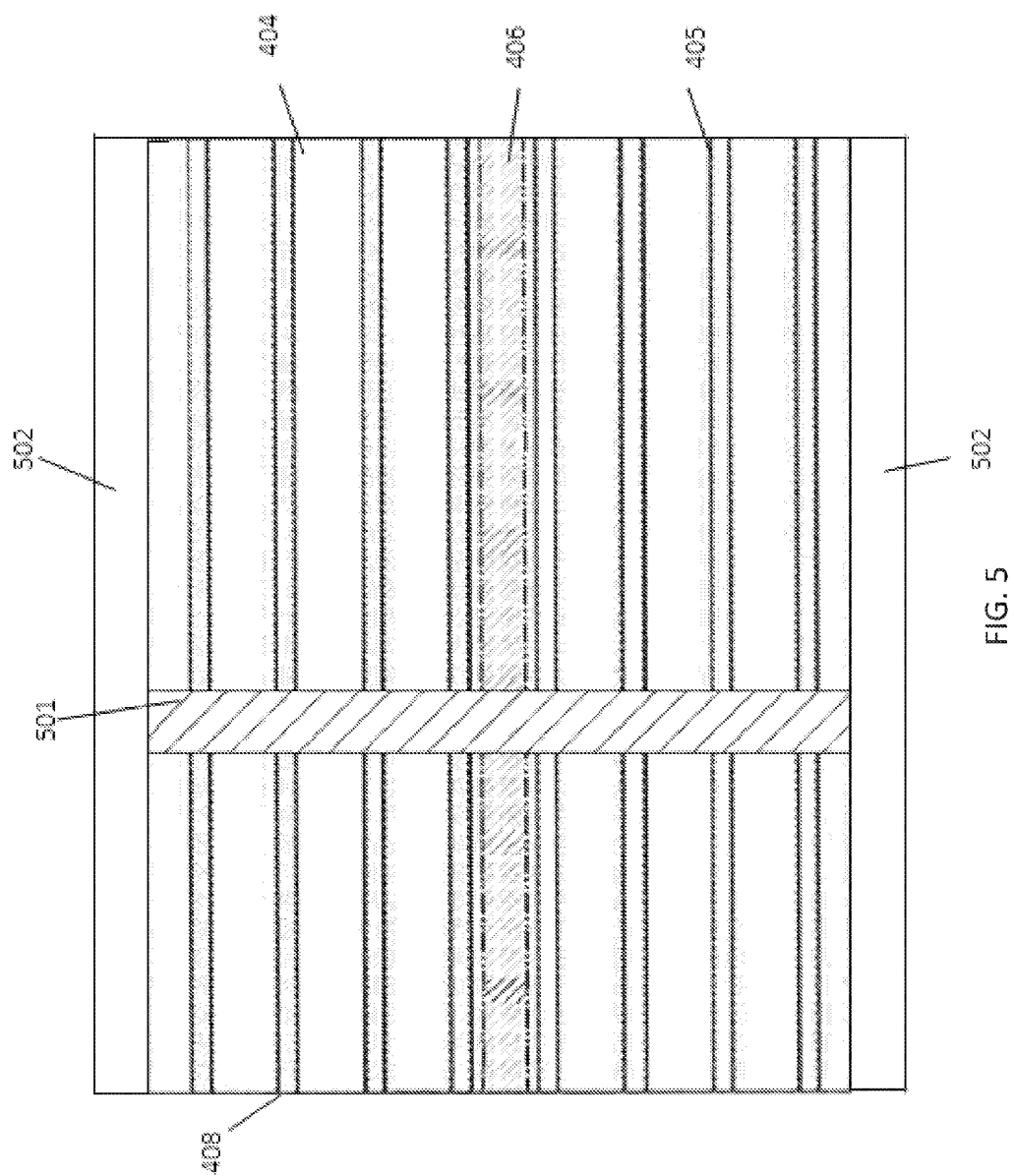
FIG. 5 shows a top schematic diagram of an underbody in the fourth example of the present disclosure.

FIG. 5 shows a fourth example of the present disclosure. In some embodiments, a structural reinforcement cross beam 501 and side sill 502 are added on the basis of the third example in order to reinforce the bearing capacity of the underbody. Specifically, based on the processed underbody 408 in the third example, the structural reinforcement cross beam 501 is added in the width direction of the underbody 408. The reinforcement cross beam 501 is generally arranged above the underbody 408 for reinforcing the bearing capacity of the underbody. It should be noted that the number of reinforcement cross beams is not limited to one as is shown in FIG. 5. The positions and the number of the reinforcement cross beams 501 may be obtained by making a calculation of the bearing capacity of the underbody. Also shown in FIG. 5 are side sills 502 positioned along the length direction of the underbody 408. A side sill 502 is respectively added on both sides of the underbody 408.

Figure 6:
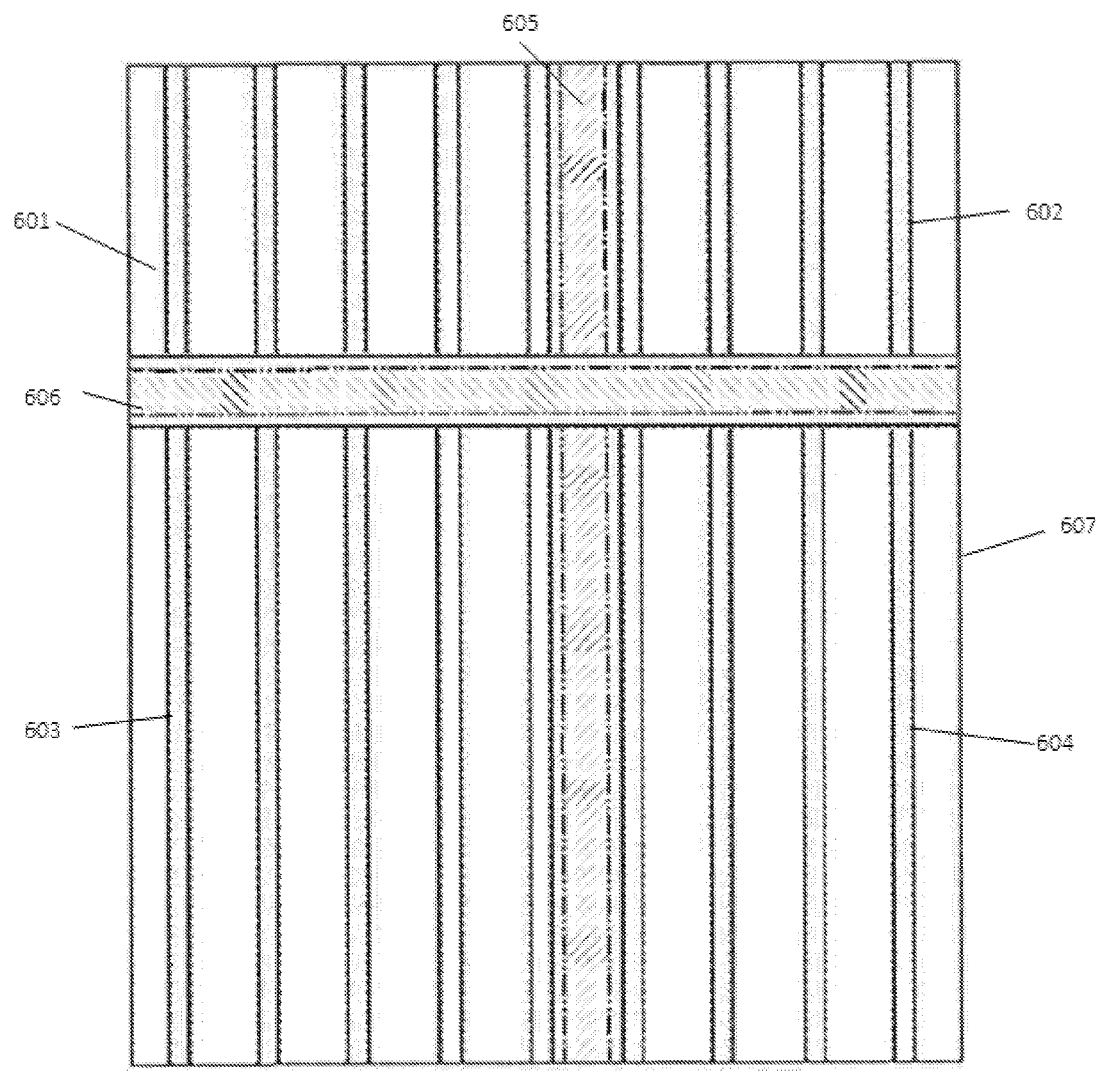
FIG. 6 shows a top schematic diagram of an underbody in the fifth example of the present disclosure.

FIG. 6 shows a fifth example of the present disclosure. The fifth example is similar to the foregoing examples, and the difference lies in that an underbody 607 is spliced by four underbody panels. As shown in FIG. 6, the underbody 607 is spliced by four underbody panels 601, 602, 603, and 604. Similar to the foregoing other embodiments, the length and width of the underbody 607 are larger than the length and the width of the largest underbody panel 101 capable of being stamped by the stamping die, while the length and width of each of the underbody panels 601, 602, 603, and 604 are smaller than the length and the width of the largest underbody panel 101 capable of being stamped by the stamping die.

The specific processing steps are similar to those in the first example. One difference is that the plate material may be cut along the width direction and the length direction, so as to select the four underbody panels 601, 602, 603, 604 with the predetermined dimensions. Another difference is that the stamped four underbody panels 601, 602, 603, and 604 are welded along the width and the length direction. The underbody panels 601, 602, 603, and 604 may be welded along the length direction to form a welding surface 605, and then the underbody panels may be welded along the width direction to form a welding surface 606, so as to splice the underbody 607.

According to the present disclosure, underbody panels of any number and any dimension (but smaller than the dimension of the largest underbody panel capable of being stamped by the stamping die) can be adopted to splice the underbody with the necessary dimension.

The technical features in the embodiments described above can be randomly combined. The foregoing descriptions are the embodiments and the accompanying drawings of the present disclosure, the above-mentioned embodiments and the accompanying drawings are not used for limiting the scope of rights of the present disclosure, and any contents implemented by the same technical means or within the scope of rights of the above-mentioned claim contents do not deviate from the scope of the present disclosure, but fall within the scope of rights of the applicant.

What is claimed is:
1. A method for manufacturing a vehicle underbody, the method comprising:

determining dimensions for the vehicle underbody, the dimensions for the vehicle underbody including a length and a width;

determining dimensions for at least two underbody panels, wherein the dimensions for the at least two underbody panels are determined based on the dimensions for the vehicle underbody;

selecting the at least two underbody panels;

putting the at least two underbody panels in a stamping die for stamping to form concave parts and convex parts on the at least two underbody panels; and welding the stamped at least two underbody panels to form the vehicle underbody which is spliced by the at least two underbody panels in the length direction and/or the width direction, so as to make the vehicle underbody reach the determined length and width.

2. The method of claim 1, wherein putting the at least two underbody panels in the stamping die for stamping includes putting the at least two underbody panels in the same stamping die for stamping.

3. The method of claim 2, wherein:

the determined dimensions of each underbody panel in the at least two underbody panels is smaller than or equal to that of the largest underbody panel capable of being stamped by the stamping die; and the determined length and width of the vehicle underbody is larger than or equal to that of the largest underbody panel capable of being stamped by the stamping die.

4. The method of claim 1, wherein selecting the at least two underbody panels includes cutting a plate material with a larger dimension to form each of the at least two underbody panels.

5. The method of claim 3, wherein:

the vehicle underbody is spliced by the at least two underbody panels;

the determined length of the vehicle underbody is larger than the length of the largest underbody panel capable of being stamped by the stamping die;

selecting the two underbody panels includes cutting a plate material along the length direction to form each of the at least two underbody panels; and the stamped at least two underbody panels are welded along the width direction to splice the vehicle underbody.

6. The method of claim 3, wherein:

the vehicle underbody is spliced by the at least two underbody panels;

the determined width of the vehicle underbody is larger than the width of the largest underbody panel capable of being stamped by the stamping die;

selecting the two underbody panels includes cutting a plate material along the width direction to form each of the at least two underbody panels; and the stamped at least two underbody panels are welded along the length direction to splice the vehicle underbody.

7. The method of claim 1, further comprising:

adding one or more structural reinforcement cross beams in the width direction of the vehicle underbody.

8. The method claim 1, further comprising:

adding a side sill to each side of the vehicle underbody along the length direction of the vehicle underbody.

9. The method of claim 1, wherein welding the stamped at least two underbody panels includes welding concave parts of any two adjacent underbody panels, and the welding surface is located on the upper sides of the concave parts.

10. The method of claim 1, wherein the dimensions for the at least two underbody panels are determined based on the dimensions for the vehicle underbody and the arrangement of the seats that are loaded on the vehicle underbody.

11. A vehicle underbody comprising:

at least two underbody panels, wherein the dimensions for the at least two underbody panels are determined based on the dimensions for the vehicle underbody, the dimensions for the vehicle underbody including a determined length and width;

concave parts and convex parts on the at least two underbody panels, wherein the concave parts and convex parts are formed using a stamping die;

a welded joint between the at least two underbody panels, forming the vehicle underbody, wherein the vehicle underbody is spliced by the at least two underbody panels in the length direction and/or the width direction, so as to make the vehicle underbody reach the determined length and width.

12. The vehicle underbody of claim 11, wherein the concave parts and convex parts on the at least two underbody panels are formed using the same stamping die.

13. The vehicle underbody of claim 12, wherein:

the determined dimensions of each underbody panel in the at least two underbody panels is smaller than or equal to that of the largest underbody panel capable of being stamped by the stamping die; and the determined length and width of the vehicle underbody is larger than or equal to that of the largest underbody panel capable of being stamped by the stamping die.

14. The vehicle underbody of claim 11, wherein the at least two underbody panels are cut from a plate material with a larger dimension to form each of the at least two underbody panels.

15. The vehicle underbody of claim 13, wherein:

the vehicle underbody is spliced by the at least two underbody panels;

the determined length of the vehicle underbody is larger than the length of the largest underbody panel capable of being stamped by the stamping die;

the at least two underbody panels are cut from a plate material along the length direction to form each of the two underbody panels; and the at least two underbody panels are welded along the width direction to splice the vehicle underbody.

16. The vehicle underbody of claim 13, wherein:

the vehicle underbody is spliced by the at least two underbody panels;

the determined width of the vehicle underbody is larger than the width of the largest underbody panel capable of being stamped by the stamping die;

the two underbody panels are cut from a plate material along the width direction to form each of the at least two underbody panels; and the at least two underbody panels are welded along the length direction to splice the vehicle underbody.

17. The vehicle underbody of claim 11, further comprising:

one or more structural reinforcement cross beams in the width direction of the vehicle underbody.

18. The vehicle underbody of claim 11, wherein the welded joint joins concave parts of any two adjacent underbody panels, and the welded joint is located on the upper sides of the concave parts.

* * * * *